United States Patent [19]

Yu et al.

[11] Patent Number: 5,004,510
[45] Date of Patent: Apr. 2, 1991

[54] PROCESS FOR MANUFACTURING HIGH STRENGTH RAILROAD RAILS

[75] Inventors: Meng W. Yu; Shihuai Su; Yue Z. Chen, all of Panzhihua; Zheng, Ticheng, Chongging; Kebin Ji, Panzhihua; Shou R. Ling, Panzhihua; Jian C. Lin, Panzhihua; Jianhui Deng, Panzhihua; Kunwu Zhang, Panzhihua, all of China

[73] Assignee: PanZhiHua Iron & Steel Co., Sichuan Province, China

[21] Appl. No.: 302,907

[22] Filed: Jan. 30, 1989

[51] Int. Cl.⁵ .............................................. C21D 9/04
[52] U.S. Cl. .................................. 148/146; 148/150; 148/320
[58] Field of Search ................ 148/145, 146, 150, 320

[56] References Cited

U.S. PATENT DOCUMENTS

| 4,375,995 | 3/1983 | Sugino et al. | 148/12.4 |
| 4,486,248 | 12/1984 | Ackert et al. | 148/145 |

FOREIGN PATENT DOCUMENTS

| 55-23885 | 6/1980 | Japan . | |
| 428019 | 3/1975 | U.S.S.R. | 148/145 |

Primary Examiner—Deborah Yee
Attorney, Agent, or Firm—John R. Pegan

[57] ABSTRACT

Steel rails having reduced camber and improved wear resistance provided by enhanced rail head strength and hardness level decreasing uniformly from the rail head surface to a depth of 15 to 25 mm. are produced by a method and apparatus in which the rail is preheated below the $A_{c3}$ temperature, heated above the $A_{c3}$, cooled in air, cooled three dimensionally with compressed air directed on the top and at an angle of 1–10 degrees onto the sides of the rail head, and further cooled with liquid coolant.

15 Claims, 6 Drawing Sheets

FIG. 1
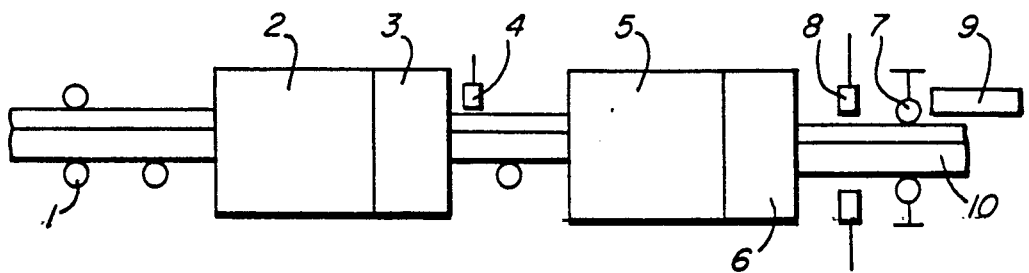
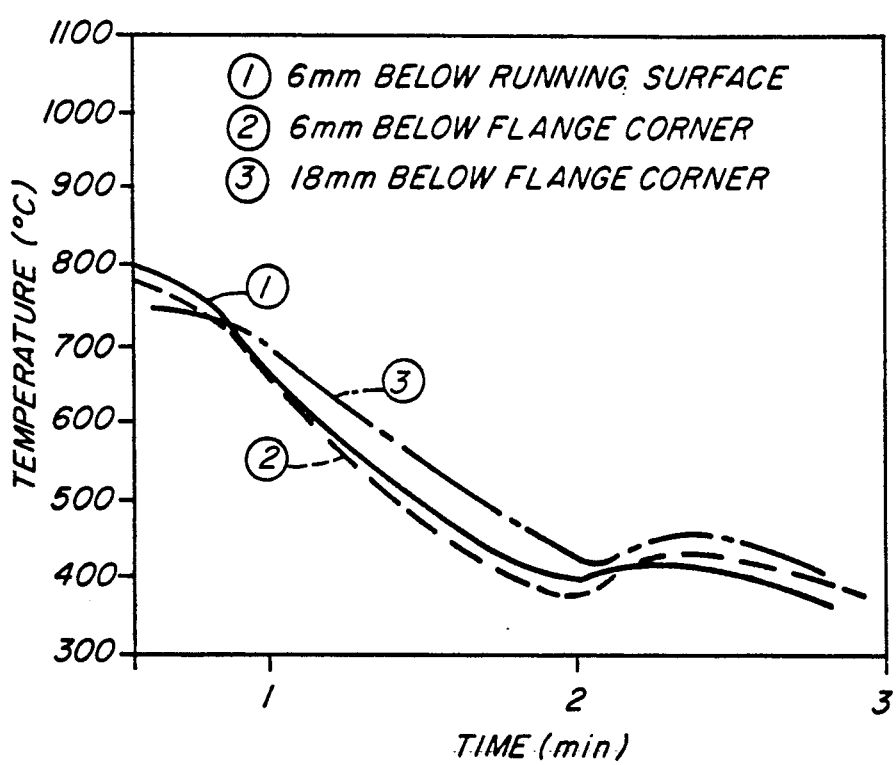
FIG. 2

FIG. 7a
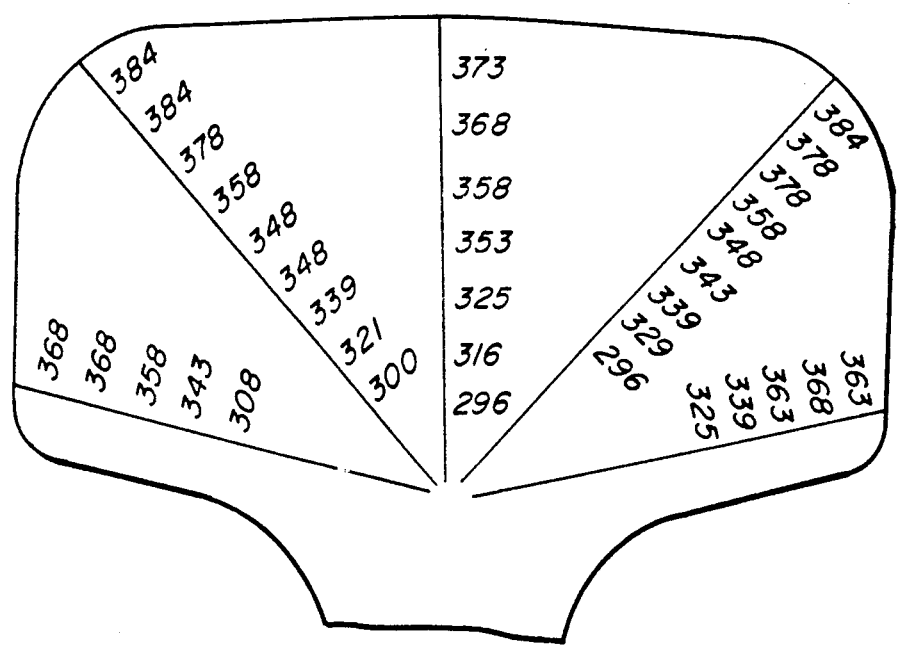
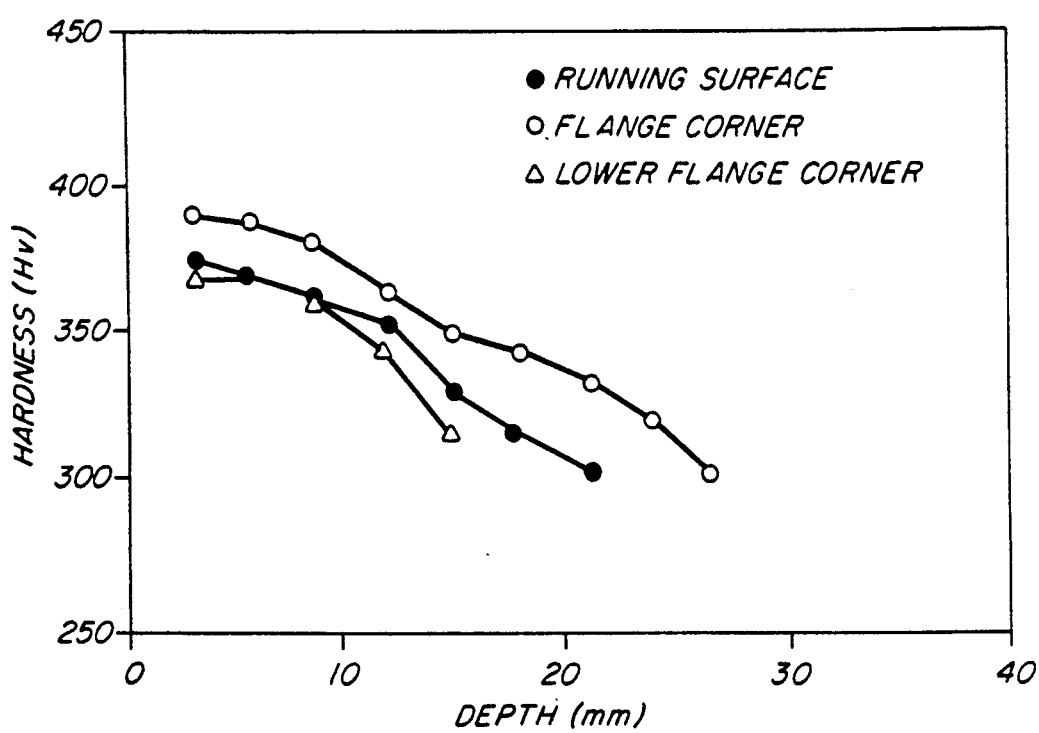
FIG. 7b

FIG. 8a
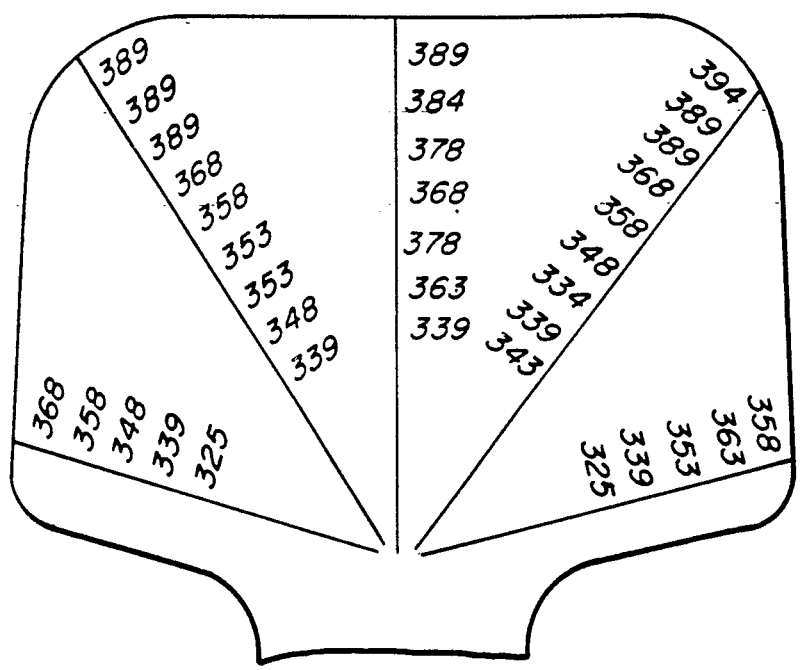
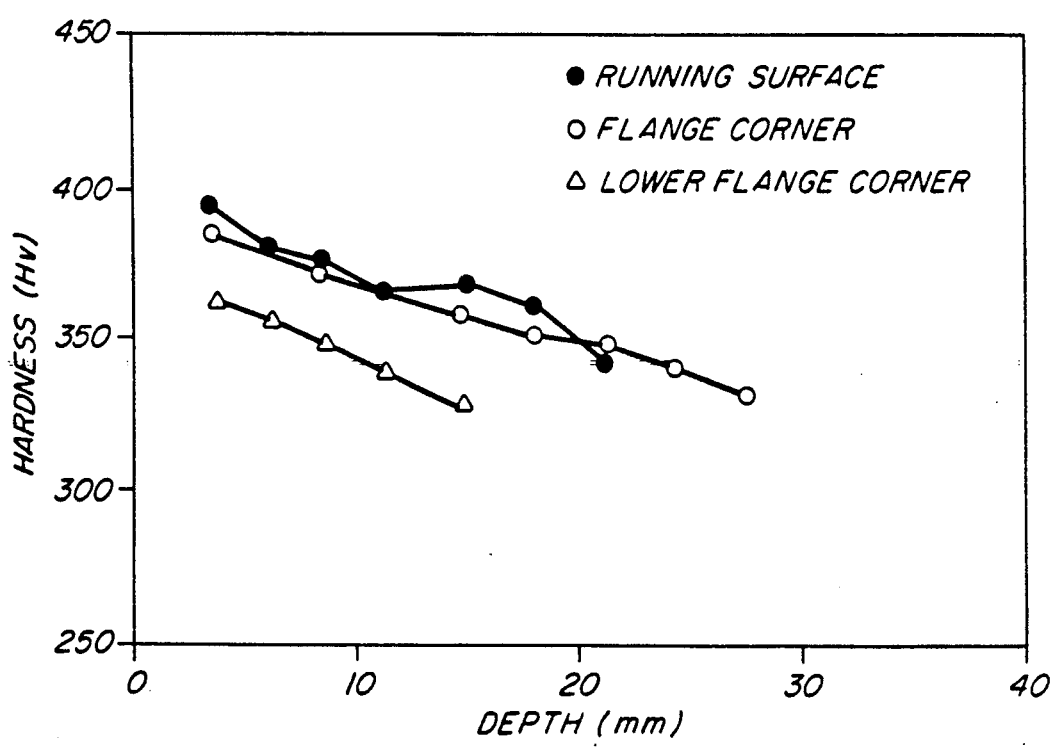
FIG. 8b

FIG. 9a
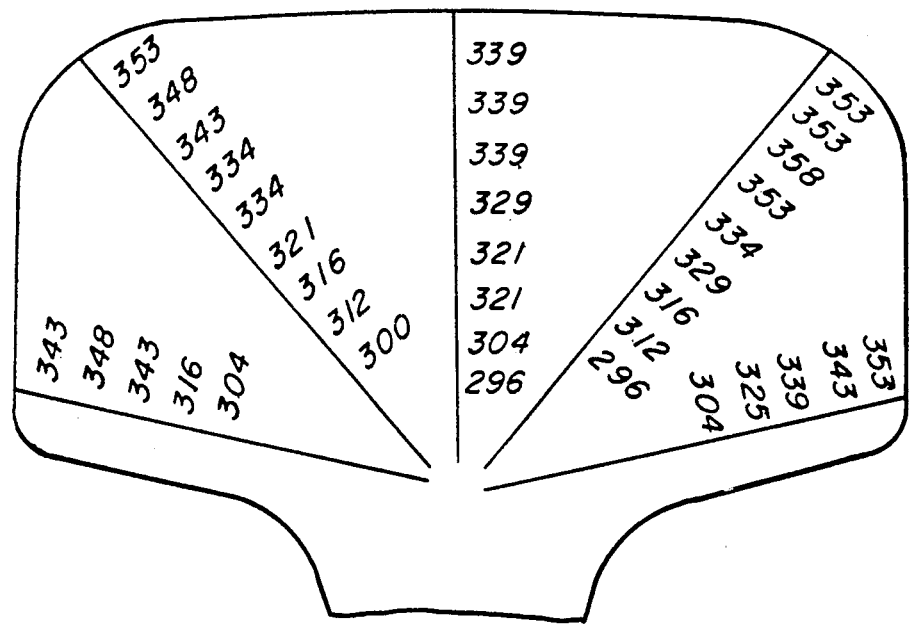
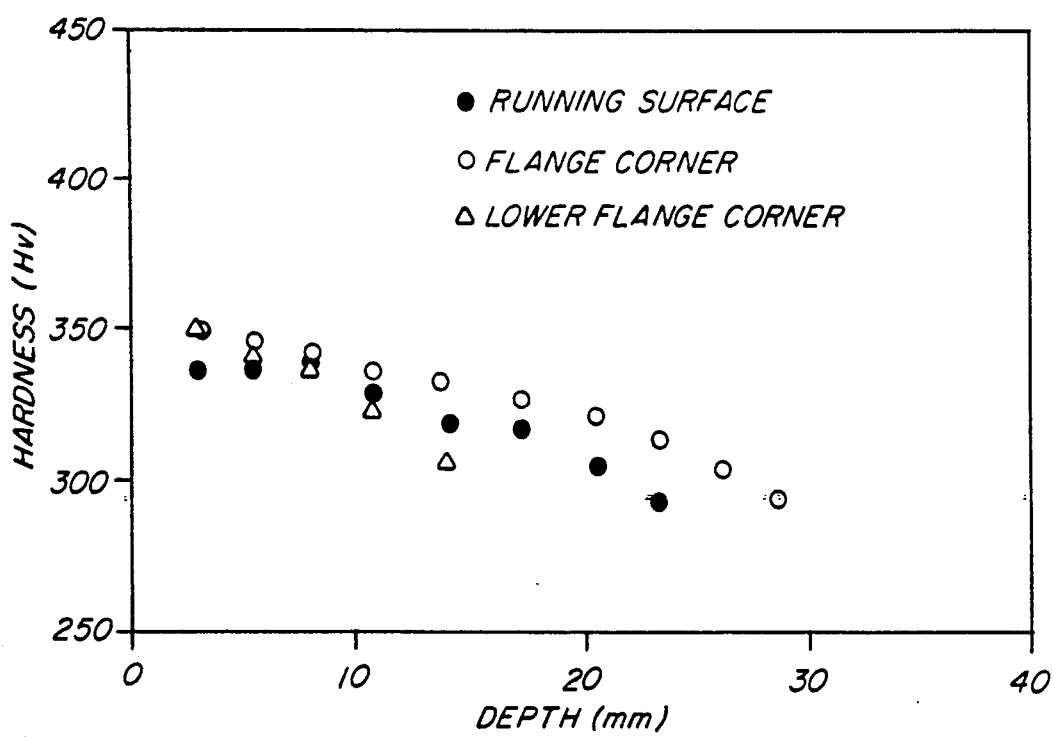
FIG. 9b

PROCESS FOR MANUFACTURING HIGH STRENGTH RAILROAD RAILS

BACKGROUND OF THE INVENTION

With increasing speed, axial load and quantity of rail traffic, railroad rails are subjected to increasing wear and fatigue and the service life of such rails is commensurately decreasing. The whole length quenching process has been developed in order to improve the useful properties and life of railroad rails and thereby to meet the requirements of railway traffic by providing rails of higher wear and fatigue resistance. Japanese Patent No. 55-23885 describes in detail a heat treatment process of manufacturing high strength rails and represents current improved rail manufacturing processes. However, the disadvantages of this Japanese process include the following:

(1) non-uniform strength of the rail head after heat treatment;
(2) relatively large longitudinal camber ratio after heat treatment;
(3) comparatively low production speed, and
(4) high consumption of cooling air.

SUMMARY OF THE INVENTION

The present invention provides an improved heat treating process for the manufacture of railroad rails. This process achieves, not only a fine pearlitic structure with hardness uniformly decreasing from the surface to the interior of the rail head, but also a smaller longitudinal camber ratio, together with improved production rate.

This invention also provides improved apparatus for manufacturing high strength railroad rails and for further hardening of the rail head with hardness distribution decreasing uniformly from surface to interior of the rail head.

The heat treatment process of the invention is described by the following steps.

The entire body of a railroad rail, formed by rolling, is preheated by a first industrial frequency inductor, preferably at a preheating rate of 2.0 to about 5.0 deg. C./sec., to heat the rail to a temperature range of 500 to about 550 deg. C.

Secondly, the rail head is heated by a second, medium frequency inductor, preferably at a rate of 6.5 to about 20 deg. C./sec. to heat the rail above the austenitizing temperature, $A_{c3}$, i.e. 850 to about 950 deg. C.

The rail then is cooled in air, preferably to a temperature within the range of 780 to about 730 deg. C., to provide a more uniform internal rail head temperature.

Thereafter, the rail head is quenched by compressed air blowing using a first three dimensional air injection device positioned around the rail head portion. The top surface of the rail head thereby is cooled by an injection header portion of this device, and the two side surfaces of the rail head are cooled by a pair of injection header portions of the air injection device. Each injection header comprises several tens of nozzles. Air flow rate through the nozzles to the rail head is 40 to about 70 meter$^3$/min., and the angles between the two side injection headers and the (vertical) symmetric axis of the rail cross section are within the range of 1 to about 10 degrees. The rails thereby are cooled, at a rate of 4.6 to about 15 deg. C./sec. to a temperature of 550 to about 450 deg. C.

Subsequently, the rail head is further cooled to 450 to about 200 deg. C., at a rate from 4.4 to about 11.1 deg. C./sec., by spray injection of a cooling liquid, such as water at a flow rate of 150 to about 250 liters/min., through a second three dimensional cooling header device, to achieve, in a rail head depth of 15 to about 25 mm., a desired fine pearlitic structure of uniform hardness in the range of $H_v$ (Vickers) 400 to $H_v$ 306 (equivalent Brinell hardness, $H_B = 390$-$300$) decreasing from the surface to the interior.

Finally, the rail head is yet further cooled by a liquid cooling medium to maintain a predetermined temperature difference, from 50 to about 100 deg. C., between the rail head and the rail base and to control and aid in reducing longitudinal camber ratio imparted by heat treatment.

With use of this process, the velocity of continuous single directional movement of the rail in respect to the heat treatment apparatus can be increased to 0.8–1.6 meters/min.

To obtain different strengths in rails of the same composition, the quenching rate is regulated by different flow of compressed air. The hardness, $H_v$, is determined by the formula:

$$H_v = 9V + 265$$

where V is the cooling rate, deg. C/sec.

DESCRIPTION OF PREFERRED EMBODIMENT

A better understanding of the present invention may be had by reference to the following further description and drawings wherein:

FIG. 1 is a side elevation of one embodiment of the apparatus for carrying out the process of the present invention;

FIG. 2 is a time-temperature cooling curve of rail head cooling rate in accordance with the invention;

Figure 6A:
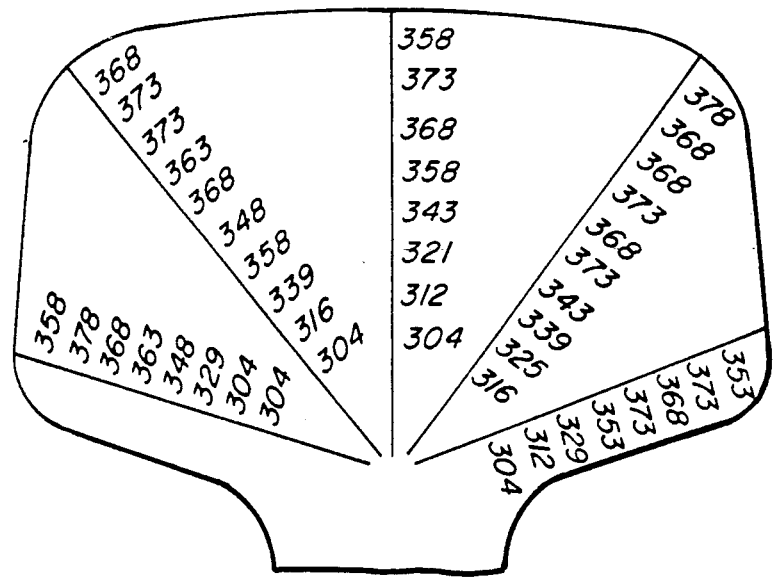
Figure 6B:
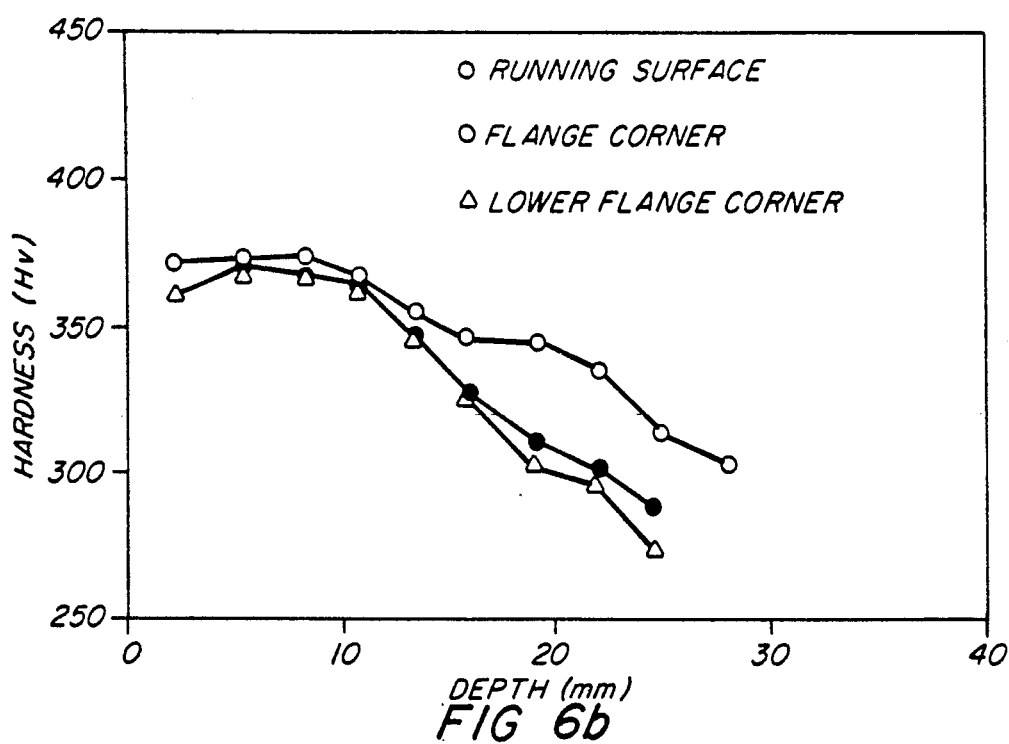

FIG. 6a and FIG. 6b respectively show the measured hardness and hardness depth curves of 50 kg/m. rail after heat treatment in accordance with this invention;

FIG. 7a and FIG. 7b respectively show the measured hardness and hardness depth curves of 60 kg/m. rail after heat treatment in accordance with the invention;

FIG. 8a and FIG. 8b respectively show the measured hardness and hardness depth curves of 75 kg/m. rail after heat treatment in accordance with the invention, and FIG. 9a and FIG. 9b respectively show the measured hardness and hardness depth curves of secondary 50 kg/m. rail after heat treatment in accordance with the invention.

As shown in FIG. 1, the presently preferred embodiment, rail 10 to be heat treated is passed through the heat treating operation, by means of feed rolls 1, in a single direction from left to right in that Fig., at a velocity of 0.8 to about 1.6 m./min. A preheater 2, which covers the rail, is a general industrial frequency inductor providing induced current to preheat the whole body of the rail to 500 to about 550 deg. C. The rail head only then is heated with a general medium frequency inductor 3, using the induced current to heat the rail head at a rate of 6.5 to about 20.0 deg. C./sec. to a temperature of 850 to about 950 deg. C.

By means of such preheating and heating, there is more heat energy in the head portion of the rail, but a small temperature gradient is maintained between the head portion and the base portion in order to control the rail camber ratio in the longitudinal direction. A temperature sensing device 4 is placed at the exit of heater 3 to detect rail temperature.

The rail then is cooled in air to a temperature between 780 and about 730 deg. C. to further decrease the temperature gradient of the rail head.

Figure 3:
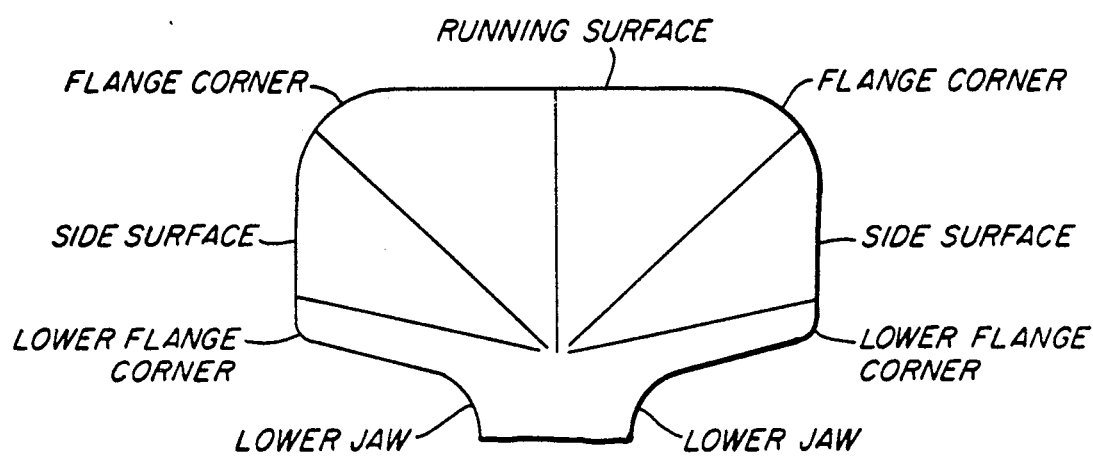
FIG. 3 is a schematic diagram showing the names commonly used in identifying various parts of a rail head cross section.
Figure 4:
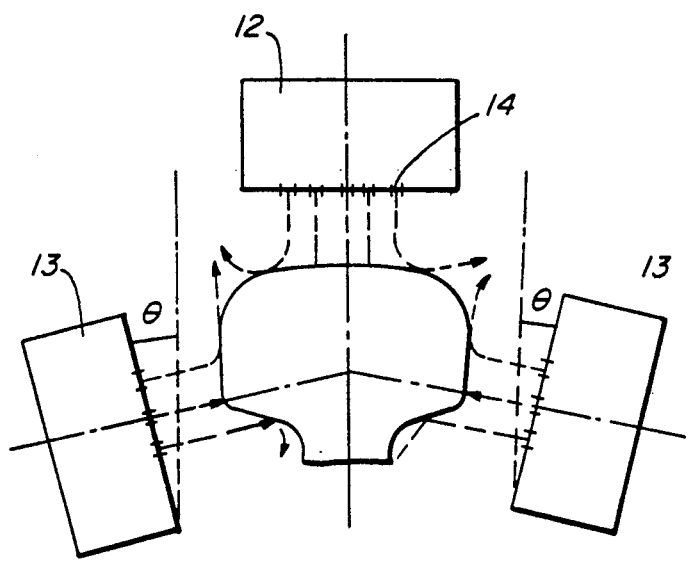
FIG. 4 is a side elevation of the three dimensional air injection device of the present invention.

As shown in FIG. 1, the rail then is passed into a first, three dimensional air injection cooling device 5 where the rail head is further cooled with compressed air to a temperature in the range from 550 to about 450 deg. C. at a cooling rate of 4.6 to about 15 deg. C./sec. to form the fine pearlitic structure in the rail head. As shown in FIG. 4, this device consists of a first cooling header 12 to cool the running surface of the rail head and a pair of second cooling headers 13 to cool the two side surfaces of the rail head. Cooling header 12 and cooling headers 13 are connected, by air circuit means (not shown) to control valves (not shown) controlling the supply of compressed air to the headers. The air supply circuits and control valves respectively associated with header 12 and headers 13 are mutually independent. As also shown in diagramatic form in FIG. 4, there are a plurality, e.g. several tens, of nozzles 14 in each of the headers 12 and 13. The angles, $\theta$, between the nozzles of the two side cooling headers and the symmetrical axis of the cross section of the rail are in the range from 1-10 degrees. According to this feature, the directions of the compressed air streams blown onto the rail head are such as to improve the cooling effect on the bottom corners and the bottom plates of the rail head by increasing the uniformity of hardness and making the top corners and the running surface of the rail head approach the same hardness level.

A second, three dimensional cooling header device 6, FIG. 1, also consists of a first cooling header to cool the running surface of the rail head and a pair of second cooling headers to cool the two sides of the rail head, in the manner of the FIG. 4 illustration. Independent air and water supply circuits are provided for each cooling header; the two side cooling headers may be in the same supply circuit. Each of these headers also has, for example, several tens of nozzles, which are controlled to provide 150 to about 250 liters/hour of water flow to cool the rail head to 450 to about 200 deg. C. at a cooling rate of 4.4 to about 11.1 deg. C./sec. in conformity with formation of the fine pearlitic structure of hardness $H_v400$ to $H_v306$ with the hardness decreasing uniformly from the surface for 15 to about 25 mm. into the interior of the rail head.

Figure 5:
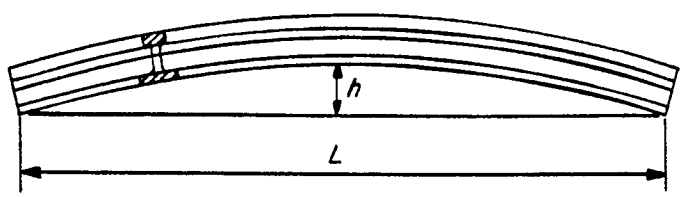
FIG. 5 is a side view of a rail showing, in exaggerated form, camber imparted to a rail.

Rollers 7 are used for regulating the position of the rail 10, and a pair of temperature sensors 8 are provided near the top and bottom of the rail to measure the temperature difference between the rail head top and the rail base bottom. The sensed temperature difference signal is transmitted to a controller (not shown) to control operation of a third cooling means 9 for injecting a liquid cooling medium (e.g. water, oil, or other suitable liquid coolant) to the rail head, and maintaining the temperature of the rail head from 50 to about 100 deg. C. higher than that of the rail base, and causing the rail longitudinal camber ratio, h/L, FIG. 5, to decrease to less than 100 mm/25 meters after heat treatment.

The apparatus elements of FIG. 1 such as the preheater 2, heater 3, temperature sensor 4, fluid injection devices 5 and 6, temperature sensor 8 and cooling device 9, are arranged in the described sequence and fixed to supporting frames without connection or relation with the system for driving the rail 10 past these elements.

The FIG. 2 graphs relate the time-temperature rail head cooling relationship for: (1) 6 mm. below the running surface of the rail head; (2) 6 mm. below the top corner of the rail head, and (3) 18 mm. below the top corner of the rail head.

The present invention is further illustrated by the following examples.

EXAMPLE 1

50 kg/m. rail, having a composition, by weight percent, 0.78% C, 0.23% Si, 0.85% Mn, up to 0.035% S and up to 0.035% P, balance iron and incidental impurities was heat treated in the manner herein disclosed, with the rail moving at a velocity of 1.30 m./min. Other conditions included: preheating rate of 4.8 deg. C./sec., preheated temperature of 540 deg. C., heating rate of 18 deg. C./sec., heated temperature of 890 deg. C., cooling in air to 760 deg. C. The rail head then was blown with compressed air at a flow of 40 m³/min. to cool the rail head to 500 deg. C. at a cooling rate of 11 deg. C./sec. The angles $\theta$ between the two side cooling headers 13 of the three dimensional air injection device and the axis of the rail head cross section were 8 degrees. The rail head subsequently was sprayed with a liquid coolant at a flow rate of 160 l/hr. to cool it to 200 deg. C. at a cooling rate of 8.3 deg. C./sec. Thereafter the rail head was sprayed with water of sufficient quantity to maintain the rail head at a temperature 50 deg. C. higher than the rail base.

FIG. 6a and FIG. 6b show, respectively, the hardnesses and the graphic hardness depth curves of the rail head cross section so treated. The corresponding mechanical properties are shown in the following Table 1.

TABLE 1

| $\sigma$ 0.2 (MPa) | $\sigma$ b (MPa) | $\delta$ 5 (%) | $\psi$ (%) |
|---|---|---|---|
| 902.5 | 1295.4 | 14.2 | 38.2 |

The longitudinal camber was 40 mm for the whole 25 m. length of the 50 kg/m rail.

EXAMPLE 2

60 kg/m. rail, having a composition, by weight percent, 0.77% C, 0.25% Si, 0.88% Mn, up to 0.035% S and up to 0.035% P, balance iron and incidental impurities was heat treated in the manner herein disclosed, with the rail moving at a velocity of 1.21 m./min. Other conditions included: preheating rate of 4.1 deg. C./sec., preheated temperature of 545 deg. C., heating rate of 14 deg. C./sec., heated temperature of 930 deg. C., cooling in air to 778 deg. C. The rail head then was blown with compressed air at a flow of 55 m³/min to cool the rail head to 490 deg. C. at a cooling rate of 10.5 deg. C./sec. The angles $\theta$ between the two side cooling headers 13 of the three dimensional air injection device and the axis of the rail head cross section were 6 degrees. The rail head subsequently was sprayed with a liquid coolant at a flow rate of 220 l/hr. to cool it to 250 deg. C. at a cooling rate of 9.1 deg. C./sec. Thereafter the rail head was sprayed with water of sufficient quantity to maintain the rail head at a temperature 70 deg. C. higher than the rail base.

FIG. 7a and FIG. 7b show, respectively, the hardnesses and the graphic hardness depth curves of the rail head cross section so treated. The corresponding mechanical properties are shown in the following Table 2.

TABLE 2

| $\sigma$ 0.2 (MPa) | $\sigma$ b (MPa) | $\delta$ 5 (%) | $\psi$ (%) |
|---|---|---|---|
| 880 | 1240.4 | 14 | 47 |

The longitudinal camber was 90 mm for the whole 25 m. length of the 60 kg/m rail.

EXAMPLE 3

75 kg/m. rail, having a composition, by weight percent, 0.78% C, 0.27% Si, 0.95% Mn, up to 0.035% S and up to 0.035% P, balance iron and incidental impurities was heat treated in the manner herein disclosed, with the rail moving at a velocity of 1.20 m./min. Other conditions included: preheating rate of 4.5 deg. C./sec., preheated temperature of 550 deg. C., heating rate of 12 deg. C./sec., heated temperature of 910 deg. C. The rail head was blown with compressed air at a flow of 70 m$^3$/min. to cool the rail head to 480 deg. C. at a cooling rate of 10 deg. C./sec. The angles $\theta$ between the two side cooling headers 13 of the three dimensional air injection device and the axis of the rail head cross section were 5 degrees. The rail head subsequently was sprayed with a liquid coolant at a flow rate of 220 l/hr. to cool it to 280 deg. C. at a cooling rate of 9.8 deg. C./sec. Thereafter the rail head is sprayed with water of sufficient quantity to maintain the rail head at a temperature 80 deg. C. higher than the rail base.

FIG. 8a and FIG. 8b show, respectively, the hardnesses and the graphic hardness depth curves of the rail head cross section so treated. The corresponding mechanical properties are shown in the following Table 3.

TABLE 3

| $\sigma$ 0.2 (MPa) | $\sigma$ b (MPa) | $\delta$ 5 (%) | $\psi$ (%) |
|---|---|---|---|
| 879 | 1261.1 | 14.8 | 36 |

The longitudinal camber was 80 mm for the whole 25 m. length of the 75 kg/m rail.

EXAMPLE 4

For the steel chemical composition of Example 1, from the formula, $H_v = 9V + 265$, it is known that, in order to obtain rail of secondary (different) strengths, among the several process variables only the cooling rate of injected compressed air need be changed. Assuming a steel of Vickers hardness $H_v$ from 340 to 304 and a pearlitic structure with strength uniformly decreasing from the running surface of the rail head to an interior rail depth of 20 mm., a cooling rate, V, of 7.5 deg. C./sec. is obtained. Corresponding mechanical properties are shown in the following Table 4:

TABLE 4

| $\sigma$ 0.2 (MPa) | $\sigma$ b (MPa) | $\delta$ 5 (%) | $\psi$ (%) |
|---|---|---|---|
| 740 | 1140 | 12 | 34 |

The longitudinal camber is 45 mm for the whole 25 m. length of the rail.

Table 5 shows the comparative results of putting into actual railway use, on the same railway line, the railroad rail of the present invention and rail in accordance with Japanese Patent 55-23885.

TABLE 5

| type of rail | condition of railway | | max. wear, mm. | | shelling |
|---|---|---|---|---|---|
| | radius, m. | slope, % | vert. | side | |
| Japan | 300 | 8.7 | 0.9 | 3.2 | local, slight |
| this invention | 300 | 13.5 | 1.2 | 1.6 | local, slight |

The Table 5 results were determined after one year of in-service railway use of both types of rails, during which time a total of 72,000,000 tons of materials were transported over the line in which these rails were installed.

We claim:

1. A method of treating in a heat treating zone a steel rail comprising a base connected by a web to a rail head having a top providing a running surface, a pair of lower jaws comprising bottom surfaces of the rail head, and two rail head side surfaces extending substantially normal to the top surface and defining with the top surface and the lower jaws, a pair of generally rounder upper rail head corners and a pair of generally rounded lower rail head corners, said method comprising, in the following order the steps of:

(a) inductively preheating the entire rail from a starting temperature in the range from ambient temperature to below about 500° C. to a preheat temperature in the range from about 500° C. to about 550° C.;

(b) further inductively heating the rail head to a temperature in the range from the $A_{c3}$ temperature of the steel to about 100° C. above the $A_{c3}$ temperature;

(c) cooling the rail to a temperature below the $A_{c3}$ temperature, and (d) thereafter quenching the rail head in at least two steps by directing a first plurality of streams of cooling fluid against the top running surface and in a direction substantially normal thereto and second and third pluralities of cooling fluid streams against the side surfaces and the lower jaw surfaces in directions off-set from directions respectively normal to such surfaces such that overlapping of the top and side cooling streams at the top corners of the rail head and consequent overcooling of the top corners are substantially avoided, and wherein the cooling medium of a first quenching step is a gas and the cooling medium of at least one subsequent quenching step comprises a liquid.

2. A method according to claim 1 comprising cooling the rail in step (c) to a temperature in the range from about 780° C., and initially quenching the rail head in step (d) to a temperature in the range from about 550° C. to about 450° C.

3. A method according to claim 2 wherein, in step (c), the rail is cooled in air.

4. A method according to claim 3 wherein, in step (d) the rail head is initially quenched with compressed air.

5. A method according to claim 4 additionally comprising further cooling the rail head in a second quenching step to a temperature in the range from about 450° C. to about 200° C.

6. A method according to claim 5 wherein in the second quenching step the rail head is sprayed with a cooling medium selected from the group consisting of water and a mixture of compressed air and water.

7. A method according to claim 6 wherein after the second quenching step the temperatures of the rail head and the rail base are sensed, a signal is generated corresponding to the difference in the sensed temperatures, the signal is compared to a signal corresponding to a predetermined desired temperature difference of from about 50° C. to about 100° C., and the cooling rate of the rail head is adjusted in a third quenching step in accordance with the measured temperature difference signal to maintain the rail head temperature within said desired temperature difference range.

8. A method according to claim 7 wherein the cooling medium in the third quenching step is water.

9. A method according to claim 7 further comprising sensing the rail temperature after rail head heating in step (b), generating a signal corresponding to the sensed heated rail head temperature, comparing the measured temperature signal to a predetermined desired temperature of the heated rail head, and controlling the heating of the rail head in step (b) and the cooling of the rail head in accordance with the difference between the sensed and desired temperatures of the heated rail head.

10. A method according to claim 1 wherein the fluid streams directed against the rail head side walls are at an angle from about 1 degree to about 10 degrees with respect to the vertical symmetrical axis of the rail.

11. A method according to one of claims 7 and 10 wherein the streams of fluid directed, respectively, against the top and the side surfaces of the rail head are separately controlled in adjusting the cooling rate of the rail head.

12. A method according to claim 1 wherein the inductive currents for preheating and heating are of different frequencies.

13. A method according to one of claims 1, 12 and 8 wherein the rail is passed through the heat treating zone at a rate of 0.8 to about 1.6 meters/min.

14. A method of controlling the hardness and strength of the head of a rail made of a high carbon, manganese steel containing, by weight of the steel, under about 0.30% of silicon and up to about 0.035% each of sulfur and phosphorus during cooling of the rail head from a temperature above the $A_{c3}$ temperature of the steel, comprising quenching the rail head with compressed air in amount sufficient to cool the rail head at a rate, V, in deg.C./sec., determined in accordance with the formula:

$$H_V = 9V + 265$$

from a temperature above the $A_{c3}$ temperature to a temperature in the range from about 780° C. and thereafter further quenching the rail head to a temperature from about 550° C. to about 450° C. with a spray of compressed air and water, thereby forming a fine pearlitic steel structure having a hardness in the range from $H_V$ 400 to $H_V$ 306 and decreasing uniformly from the running surface of the rail head to an interior depth of about 15 to about 25 mm.

15. A railroad rail made of a high strength, high carbon manganese rail steel containing, by weight percent, up to about 0.30% silicon, up to about 0.035% each of sulfur and phosphorus, balance essentially iron and produced by a method according to one of claims 6 and 8 wherein, when cooled to ambient temperature, the rail head has a fine pearlitic microstructure and a hardness within the range of $H_V$ 400 to $H_V$ 306 and substantially uniformly decreasing throughout the rail head from the surface thereof to an interior depth of at least about 15 mm. to about 25 mm., and exhibits a maximum longitudinal camber less than 100 mm per 25 meters.

* * * * *